United States Patent

Sarati

[15] 3,681,694

[45] Aug. 1, 1972

[54] RADIO TELECOMMUNICATION SYSTEM WITH AUTOMATIC REPLACEMENT OF DEFECTIVE CHANNELS

[72] Inventor: Luigi Sarati, Milan, Italy

[73] Assignee: Societa Italiana Telecomunicazioni Siemens S.p.A., Milan, Italy

[22] Filed: May 14, 1969

[21] Appl. No.: 824,450

[30] Foreign Application Priority Data

May 15, 1968 Italy........................16493 A/68

[52] U.S. Cl.............................325/2, 325/3, 325/31, 325/56, 340/147 SC

[51] Int. Cl..............................................H04b 3/00

[58] Field of Search.....325/2, 3, 31, 56; 340/147 SC, 340/146.1 BE; 178/70 R

[56] References Cited

UNITED STATES PATENTS 3,111,624 11/1963 Farkas..............................325/2

3,398,296 8/1968 Sarati et al.........................325/2

2,733,296 1/1956 Maggio.............................325/3

*Primary Examiner*—Robert L. Griffin

*Assistant Examiner*—George G. Stellar

*Attorney*—Karl F. Ross

[57] ABSTRACT

A telecommunication system with several parallel radio channels, operating on different frequency bands, is associated with two standby channels which can be selectively allocated to any working channel by a logic matrix responsive to partial or complete fading of signal in such working channel. Associated discriminating networks establish priorities for the selection of one standby channel over another and for having wholly defective working channels take precedence over channels with only moderately impaired transmission. A single working channel of the group may be selectively marked by a pre-emptive signal enabling this channel to take over, in the event of transmission failure, a standby channel already allocated to a nonprivileged working channel.

16 Claims, 6 Drawing Figures

INVENTOR
LUIGI SARATI
BY Karl F. Ross
ATTORNEY

INVENTOR
LUIGI SARATI

INVENTOR
LUIGI SARATI
BY Karl F. Ross
ATTORNEY

INVENTOR
LUIGI SARATI
BY Karl F. Ross
ATTORNEY

INVENTOR
LUIGI SARATI
BY Karl F. Ross
ATTORNEY

INVENTOR
LUIGI SARATI
BY Karl F. Ross
ATTORNEY

RADIO TELECOMMUNICATION SYSTEM WITH AUTOMATIC REPLACEMENT OF DEFECTIVE CHANNELS

My present invention relates to a telecommunication system in which a plurality of parallel working channels, usually constituted by radio links, extend from a transmitting station to a receiving station.

In a Paper entitled "Sistema di scambio automatico a stato solido per ponti radio a grande capacità", submitted by A. Pistilli and me to the 13th International Scientific Congress for Electronics, Rome 1966, there has been described a system of this general type having switching means at the transmitting and receiving stations for automatically relieving a defective working channel by a standby or spare channel adapted to be substituted for, or connected in parallel with, any one of the working channels. In a system in which the working channels operate on adjacent bands of an extended frequency range, two such standby channels may be provided with respective operating bands near the opposite limits of that range; the working channels may then be divided into a lower frequency group and a higher frequency group, a defective channel of the first group being relievable by a standby channel operating at the upper end of the range whereas a defective channel of the second group is relievable by a standby channel operating at the lower end of the range. This switch in frequency is advantageous since fading of a radio signal is a frequency-selective phenomenon so that failure of message transmission due to such fading is unlikely to affect another operating channel in a remote part of the range.

The general object of the present invention is to provide an improved and more versatile system for insuring continuity of communication between the two stations, with the widest possibility of remedying or at least alleviating transmission deficiencies while utilizing only a limited number of spare channels.

A more specific object is to provide means in such a communication system for discriminating between different levels of defectiveness, with allocation of a spare channel to a wholly defective working channel in preference to an only partly impaired working channel.

It is also an object of this invention to provide means for enabling the selective characterization of a particular working channel as privileged, giving the channel so designated the first call on an available spare channel.

Frequently, a radio link between two widely separated terminals is divided into a series of sections connected in tandem, each section lying between a corresponding pair of transmitting and receiving stations. In such a case the fading of the signal in a particular channel may be due to a defect in a section preceding the one whose monitoring equipment responds to the absence or insufficiency of the incoming signal. Since such a defect could not be remedied by a substitution or pairing of channels within the monitored section, the present invention also aims at preventing unnecessary channel switching under these circumstances.

A further object of this invention is to provide means for establishing a certain order of precedence among both the working channels and the available standby channels, subject to the aforedescribed priority for seriously defective and/or specially privileged working channels.

In accordance with this invention, a supervisory logic matrix co-operating with a group of working channels at the receiving station comprises a plurality of discriminating networks, each assigned to a respective working channel, which, whenever the transmission over the associated channel is impaired, receive the defect signals from the output of the monitoring equipment and ascertain the availability of a standby channel to be temporarily allocated to the affected working channel (i.e., substituted therefor or connected in parallel with it).

If a standby channel is available, a request signal is sent to the transmitting station and a preparatory signal is generated at the receiving station; upon arrival of an execution signal from the transmitting station, indicating that the switchover has been carried out at that end, a seizure signal is generated at the receiving station to complete the allocation.

The standby channel remains allocated to the failing working channel until the defect has disappeared or, in accordance with an advantageous further feature of the invention, until another defective working channel takes precedence over the one thus relieved. Such other channel may be privileged by reason of its more serious impairment or by being selectively marked with a pre-emptive signal indicating its priority status (e.g., as the carrier of a particularly significant part of the transmitted message). If the takeover request by the privileged working channel remains unsatisfied, either because of some disability of the switching circuits or because the defect is found to occur in a preceding section, the non-privileged working channel remains switched by virtue of a holding signal generated at the receiving station. If the preparatory signal generated concurrently with the request signal persists for a certain period without having been followed by a seizure signal, a timing circuit generates a disconnect signal to release the unsuccessful discriminating network.

Still another feature of this invention relates to the condition of the standby channel itself. According to this feature a test signal from that channel indicates whether the same is in perfect, impaired or wholly defective transmitting condition; in the last-mentioned instance the channel is considered unavailable for any purpose, whereas a partly impaired state qualifies it for allocation to a working channel with a higher degree of signal failure. Where the system includes a primary and a secondary standby channel, an availability signal may prevent the seizure of the secondary channel as long as the primary channel is accessible.

The above and other features of my present invention will be described in greater detail hereinafter with reference to the accompanying drawing in which.

Figure 2:
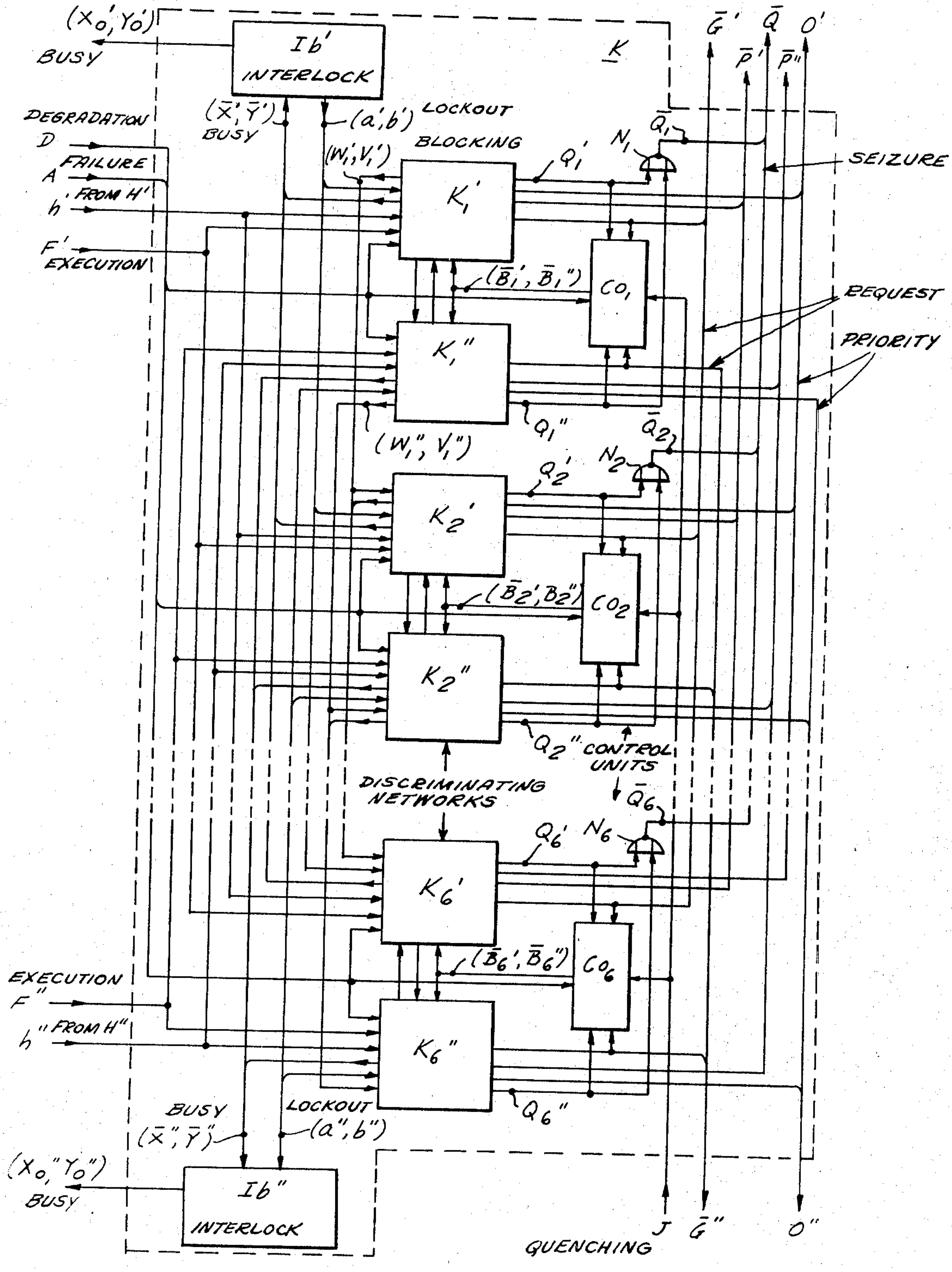
FIG. 2 is a more detailed circuit diagram of a supervisory logic matrix forming part of the system of FIG. 1.
Figure 3:
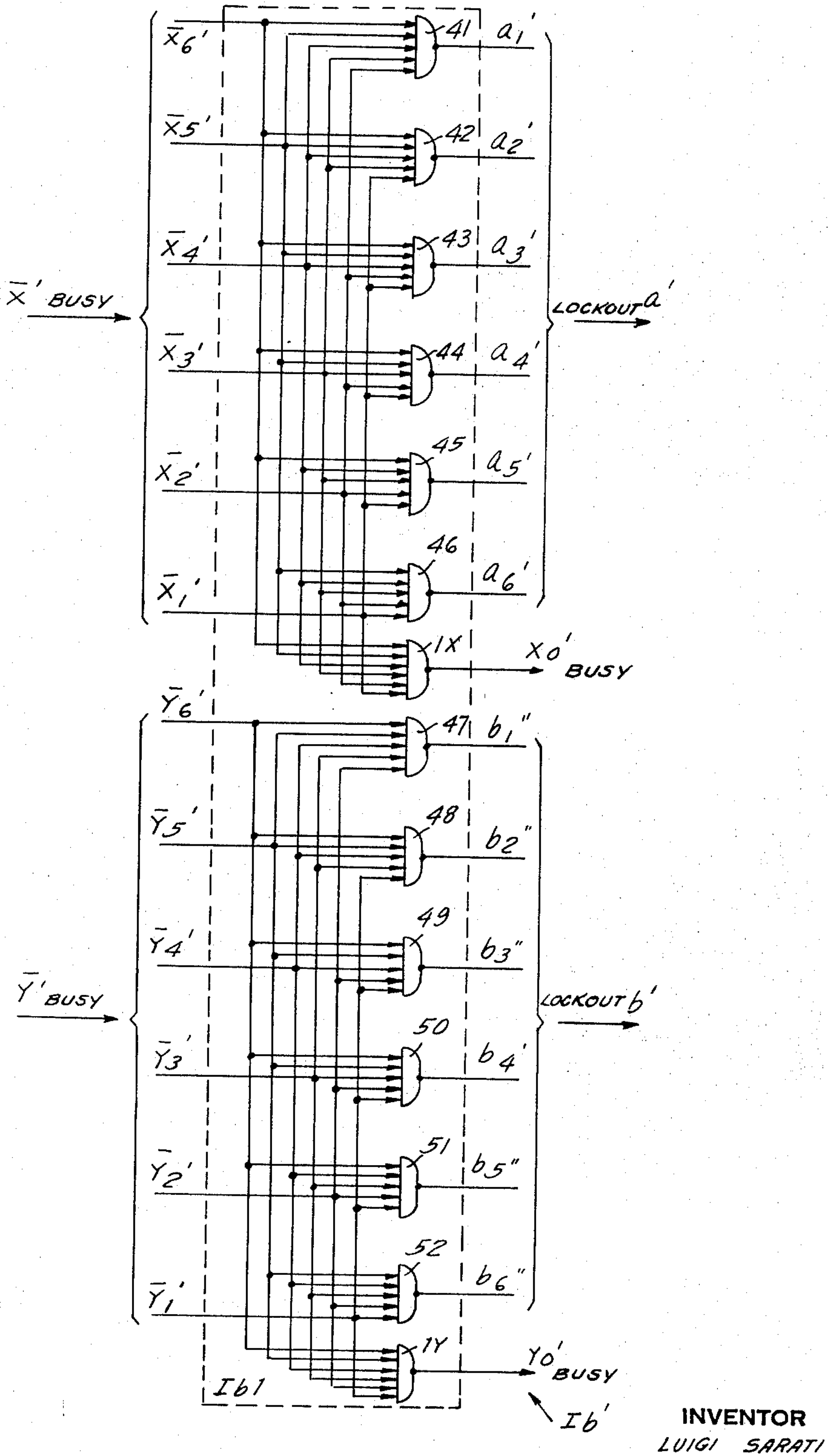
Figure 4:
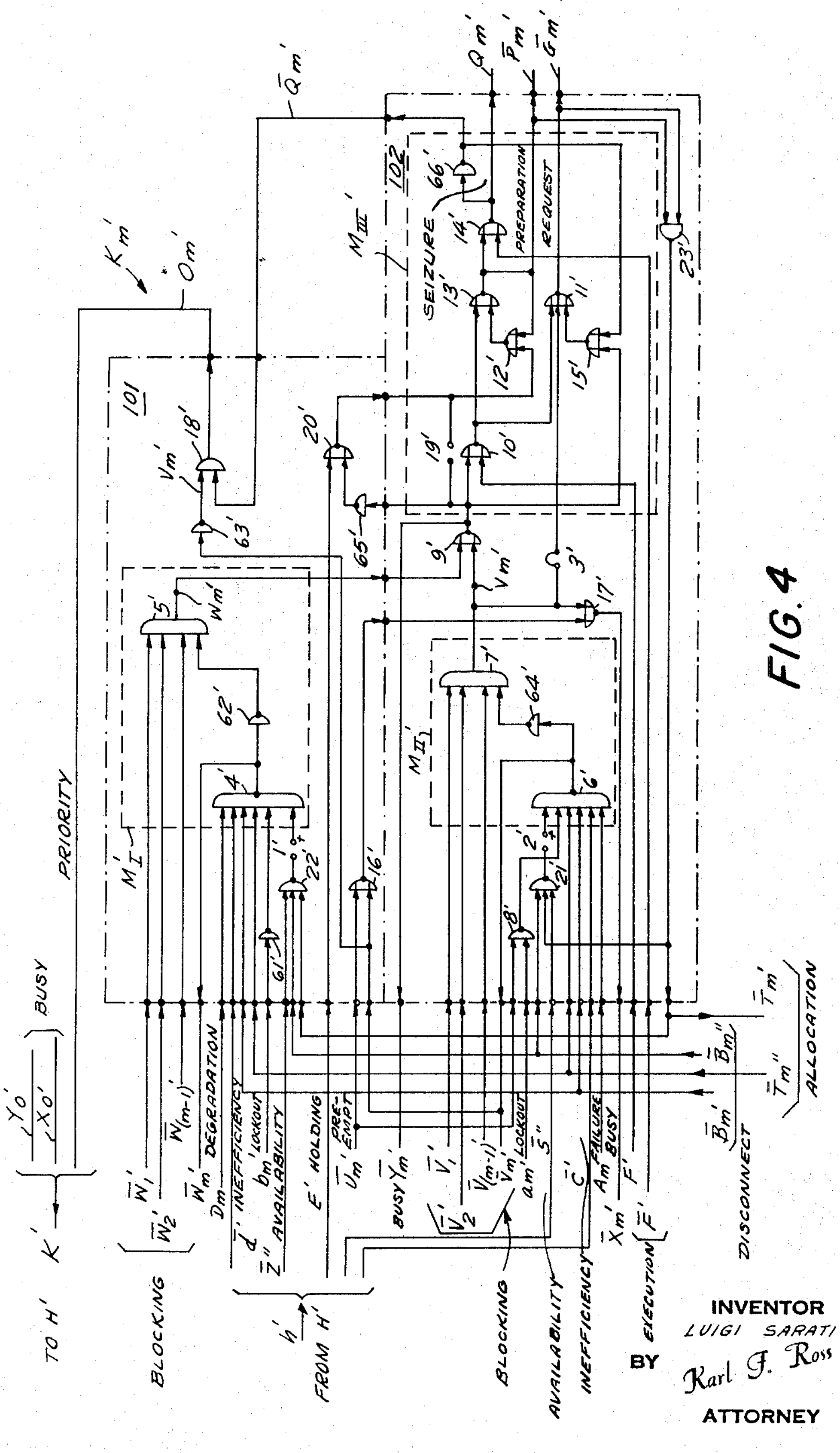
Figure 5:
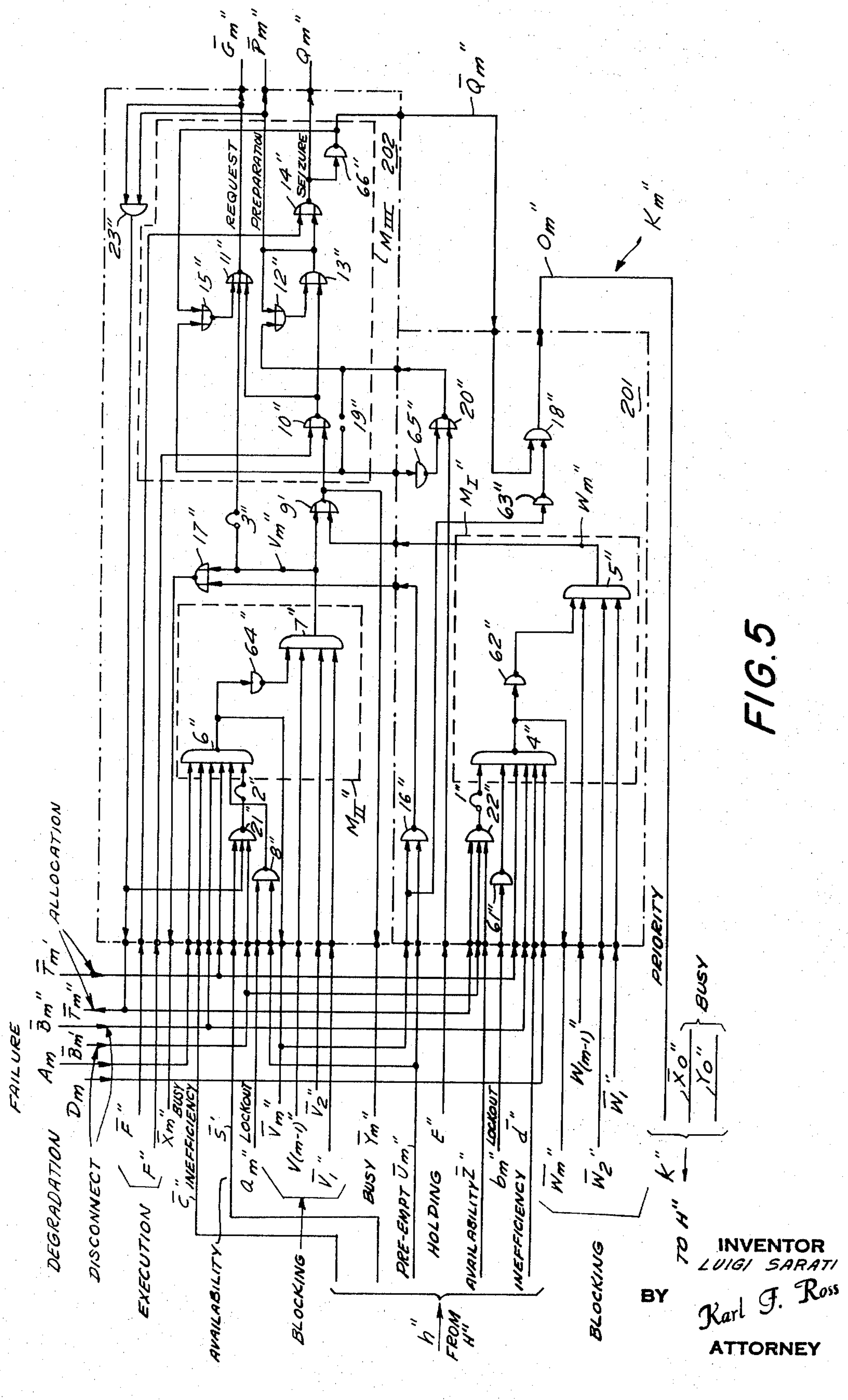
Figure 6:
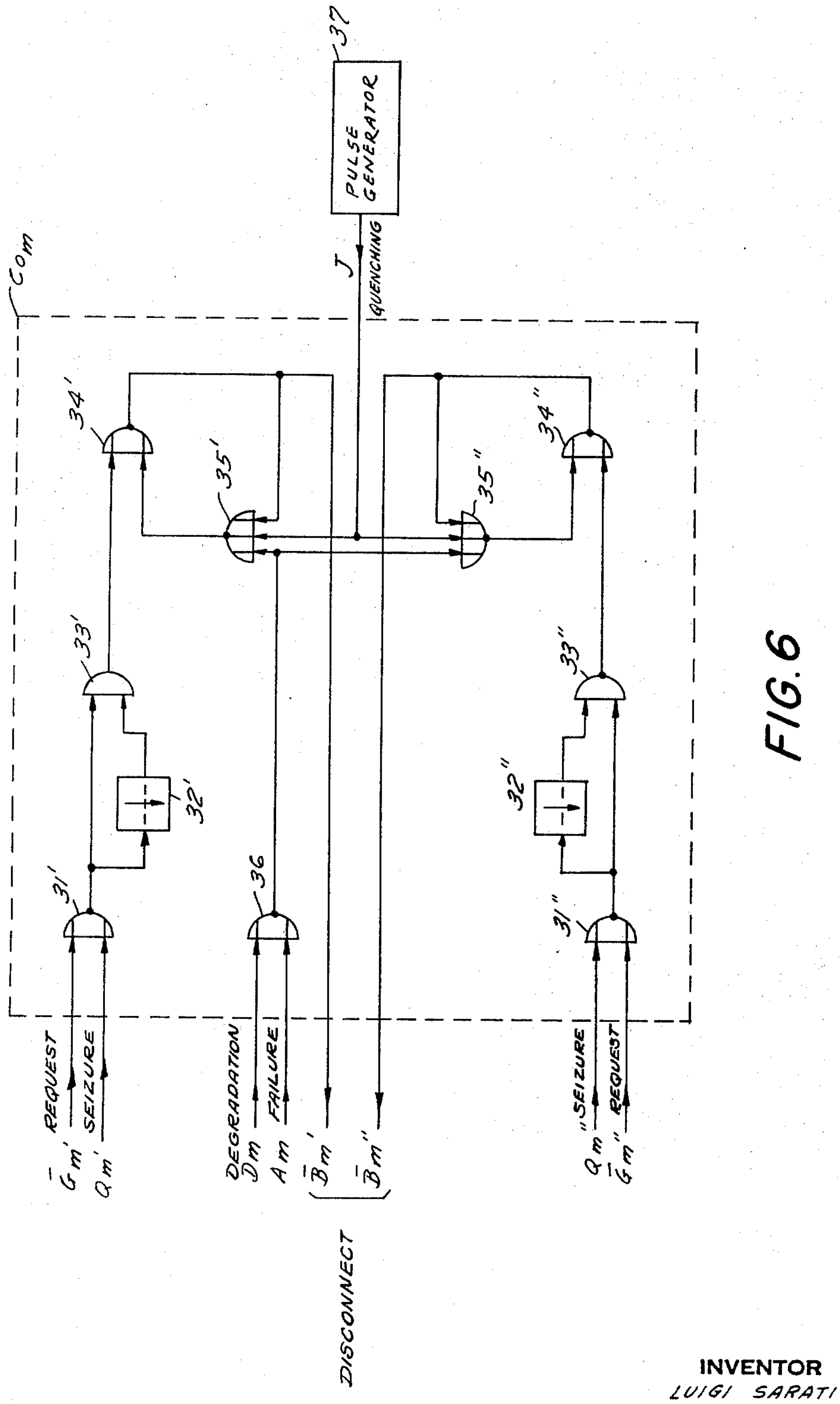

FIG. 3 diagrammatically illustrates an interlock circuit included in the matrix of FIG. 2;

FIGS. 4 and 5 are similar views of two discriminating networks included in the matrix of FIG. 2; and FIG. 6 shows the circuitry of a control unit also included in the matrix of FIG. 2.

GENERAL DESCRIPTION (FIG. 1)

Figure 1:
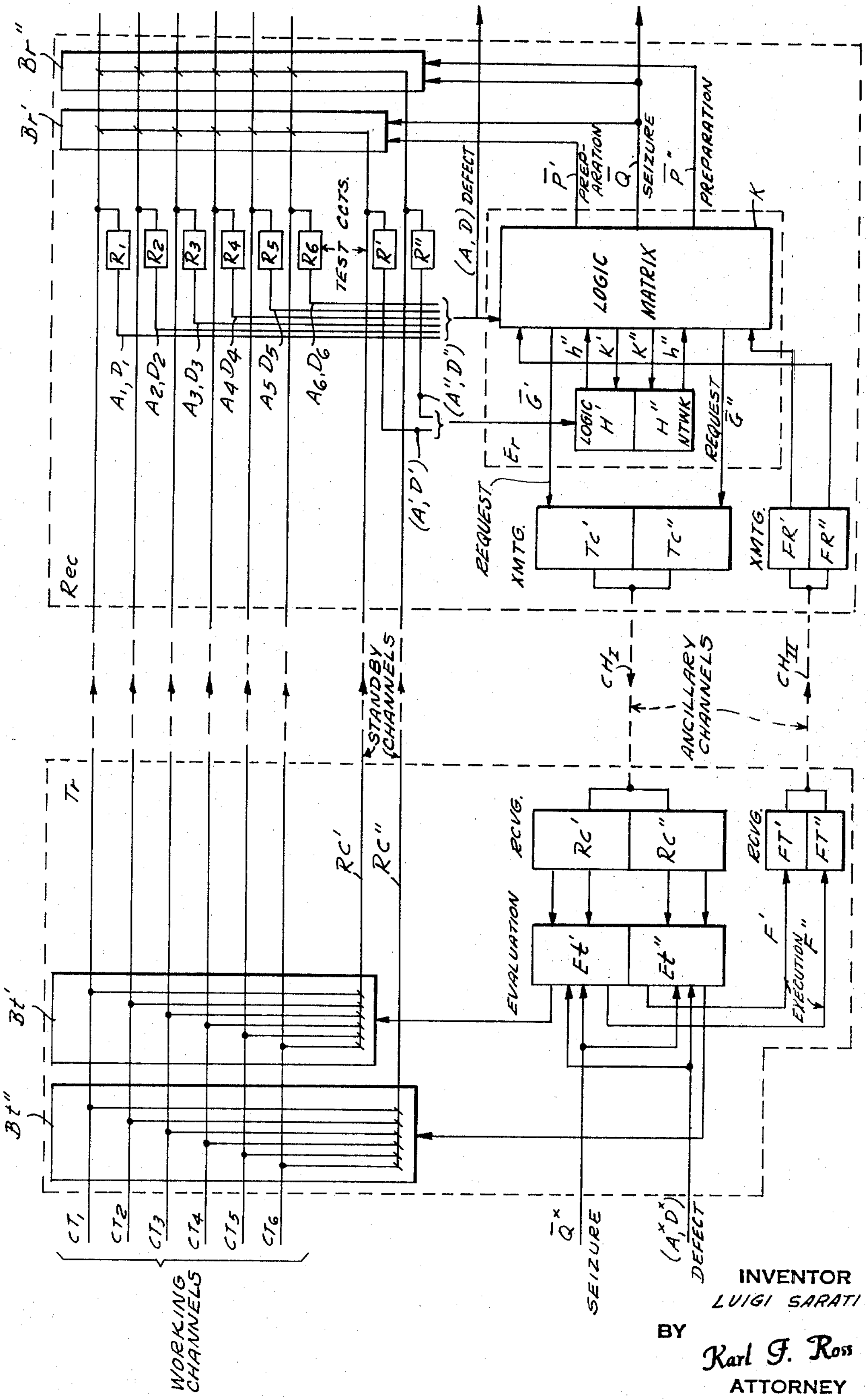
FIG. 1 is an overall block diagram of a radio telecommunication system according to my invention.

The system shown in FIG. 1 comprises, broadly, a transmitting station Tr, a receiving station Rec, and a set of working channels $CT_1 - CT_6$ as well as a pair of standby channels RC′ and RC″ interlinking the two stations. Channels $CT_1 - CT_6$ may constitute one of two groups of such channels operating in contiguous frequency bands which together occupy, say, the lower half of the overall frequency range, with channel RC′ operating near the upper end and channel RC″ operating near the lower end of this range. For the reasons explained above, the group of working channels $CT_1 - CT_6$ is given preferred access to standby channel RC′ over channel RC″; with the second group of working channels, not shown, this relationship is reversed.

Although, in this manner, as many as 12 working channels could be served effectively by only two spare channels, the following detailed description will be limited to the six working channels shown in FIG. 1.

A logic matrix K is connected to the working channels $CT_1 - CT_6$ through respective monitoring circuits $R_1 - R_6$ which derive from these channels two types of defect signals generally designated A and D; signal A indicates virtually complete absence of message signal (referred to hereinafter as "failure") whereas signal D shows only a partial disability (referred to hereinafter as "degradation"). Matrix K forms part of an evaluating stage Er which also includes a pair of ancillary matrices H′, H″ respectively associated with spare channels RC′ and RC″ to which they are connected by way of test circuits R′, R″ adapted to establish similar inefficiency signals A′, D′ and A″, D″. Matrices H′, H″ and K are interconnected by signal paths generally designated $h'$, $h''$ for signals outgoing from the ancillary matrices and $k'$, $k''$ for signals leading into these matrices from matrix K. Other outputs of matrix K carry preparatory signals $\overline{P}'$, $\overline{P}''$, respectively delivered to switching circuits Br′, Br″ at the receiving ends of channels $CT_1 - CT_6$, RC′, RC″, and a seizure signal $\overline{Q}$ delivered to both switching circuits in parallel; further outputs of this matrix deliver respective request signals $\overline{G}'$ and $\overline{G}''$ to a pair of transmitting stages Tc′, Tc″ which are connected via an ancillary channel $CH_I$ to a pair of receiving stages Rc′, Rc″ at the remote station Tr. The latter stages work into a pair of evaluation units Et′, Et″ which control the operation of switching circuits Bt′, Bt″ at the transmitting ends of the working and standby channels; these stages also receive seizure and defect signals $\overline{Q}^x$ and $A^X$, $D^x$ from a preceding radio-link section not further illustrated. The outputs of units Et′, Et″ carry execution signals F′, F″ which are sent via answer-back transmitters FT′, FT″ and another ancillary channel $CH_{II}$ to corresponding receivers FR′, FR″ at station Rec where these execution signals are fed to matrix K. Signals A, D and $\overline{Q}$ are also transmitted beyond station Rec further along the radio link to control the evaluation units at the transmitting end of the next section, in the manner illustrated for signals $A^x$, $D^x$, $\overline{Q}^x$.

An analogous arrangement, now shown, is provided for message and signal transmission in the reverse direction, i.e., from station Rec to station Tr.

Some of the signals heretofore referred to have been represented by their complements (e.g., $\overline{Q}$), rather than the original signals themselves (e.g. Q), for convenience in connection with the following detailed description of the logical circuitry. It will be understood, however, that the original and/or the inverted signal may be transmitted in each case over the respective line. Also, signals A, D, G′, G″, P′, P″ and Q are representative of groups of six signals each, such as $A_1 - A_6$, $D_1 - D_6$ etc., respectively identifying the six working channels.

Ancillary channels $CH_I$ and $CH_{II}$ may comprise radio links and/or metallic circuits.

SUMMARY OF OPERATION

Briefly, the system so far described operates as follows

Logic matrix K discriminates between three distinct levels of signal transmission which, in Boolean algebra, may be expressed by $\overline{A}\cdot\overline{D}$ (perfect transmission), $D\cdot\overline{A}$ (degradation) and $A\cdot D$ (failure), e.g., as determined by the amplitude of a pilot wave transmitted over each channel from a remote terminal in the case of the working channel and from station Tr in the case of the standby channels. Matrix K is subdivided into six discriminating networks, respectively assigned to the six working channels, which continuously (or at short intervals) receive the corresponding level information from circuits $R_1 - R_6$. If a defect signal $A_m$ or $D_m$ reaches one of these discriminating networks, the latter emits a request signal $G_m'$ or $G_m''$ for the allocation of one of the two standby channels RC′, RC″ to relieve the defective channel $CT_m$; the subscript $m$ (see also FIG. 6) denotes any one of the six working channels $CT_1 - CT_6$. The choice between the two spare channels, as expressed by the generation of either signal $G_m'$ or signal $G_m''$, is determined (a) by an inherent preference for the primary standby channel RC′, (b) by the transmission effectiveness of the two channels as determined by units H′ and H″, and (c) by the presence or absence of a concurrent request from a competing channel taking precedence over channel $CT_m$.

Upon transmission of the request signal to station Tr, the evaluation unit Et′ or Et″ addressed by that signal determines on the basis of incoming signals $Q^x$, $A^x$, $D^x$ whether the extension of the defective channel $CT_m$ toward the originating terminal (possibly including one or more standby channels in preceding sections) is in working order, since otherwise it would be useless to assign a spare channel to this particular transmission path. If the determination is positive, this unit commands the associated switching circuit Bt′ or Bt″ to connect the transmitting end of channel RC′ or RC″ in parallel with the corresponding end of the requesting channel $CT_m$, the latter thus remaining in circuit even though working only at reduced efficiency or not at all. The execution signal F′ or F″ is then sent back to station Rec where, meanwhile, a preparatory signal $P_m'$ or $P_m''$, generated concurrently with the request signal $P_m'$ or $G_m''$, had been delivered to switching circuit Br′ or Br″ as a preliminary step in the seizure of channel RC′ or RC″. If the execution signal follows the preparatory signal within a predetermined interval, a seizure signal $Q_m$ completes the switchover by connecting the receiving end of the selected standby channel to the outgoing signal path in parallel with (or in lieu of) the defective channel $CT_m$, this condition persisting until the defect signal $A_m$ or $D_m$ has disappeared.

The several working channels $CT_1$ – $CT_6$ are arranged in a predetermined order of precedence, e.g., in an ascending order according to their subscripts. If two or more working channels become concurrently defective so as to compete for access to, say, the primary standby channel RC′, the lowest ranking channel is given precedence over the others. An exception exists in the case of a channel $CT_m$ which, e.g., by the operation of a manual selector switch, has been designated as privileged; such a working channel is given access ahead of all other working channels and, if in a high state of disability (signal $A_m$), may even override a previous allocation of the selected standby channel to another, equally defective working channel. As a general rule, in the preferred embodiment herein disclosed, a channel $CT_m$ characterized by a failure signal $A_m$ takes precedence over any degraded working channel $CT_p$, characterized by a signal $D_p$, competing for the same standby channel.

After the primary standby channel RC′ has been definitely allocated, a further defective working channel may be given access to the secondary standby channel RC″ under the same set of rules.

SPECIFIC CIRCUITRY (FIGS. 2 – 6)

FIG. 2 shows details of logic matrix K. This matrix includes six pairs of discriminating networks $K_1'$, $K_1''$ (for the first working channel $CT_1$), $K_2'$, $K_2''$ (for the second working channel $CT_2$),..... $K_6'$, $K_6''$ (for the last working channel $CT_6$). The matrix further includes a set of control units $Co_1$, $C0_2$, ..... $Co_6$, one for each working channel, and a pair of interlock units Ib′, Ib″, one for each standby channel. Unit Ib′ generates two sets of lockout signals, collectively designated *a*′, *b*′, in response to busy signals respectively received from the associated set of discriminating networks $K_1'$, $K_2'$, ..... $K_6'$, these busy signals being either of a type X′ (denoting failure) or of a type Y′ (denoting degradation). In an analogous manner, unit Ib″ receives busy signals X″ (failure) and/or Y″ (degradation) from the associated networks $K_1''$, $K_2''$, ..... $K_6''$ and generates respective lockout signals *a*″, *b*″ in response thereto.

Lockout signals *a*′ or *a*″ prevent the generation of a request signal G′ or G″, in the busy state of a single network $K_m'$ or $K_m''$ of the corresponding set, by any other network of the same set except in the case of a privileged working channel as more fully described hereinafter. Lockout signals *b*′ and *b*″ have the same effect in regard to networks, other than the originating one, which are concurrently receiving degradation signals D, the inhibition being here ineffectual in the case of a network receiving a failure signal A.

FIG. 2 also shows the preparatory signals P′, P″ and seizure signals emanating from the various discriminating networks, the latter signals being collectively designated Q (represented here by their complements $\overline{Q}$) and encompassing a set of six signals $Q_1$, $Q_2$, ..... $Q_6$ each derived from a respective pair of signals $Q_1'$, $Q_1''$ (via a NOR gate $N_1$), $Q_2'$, $Q_2''$ (via a NOR gate $N_2$), ..... $Q_6'$, $Q_6''$ (via a NOR gate $N_6$). The output signals G′, G″, $Q_1'$ – $Q_6'$, $Q_1''$ – $Q_6''$ of the various discriminating networks are fed to the associated control units $Co_1$ – $Co_6$, together with defect signals D, A and a periodic timing or quenching pulse J, in order to give rise to disconnect signals $B_1'$, $B_1''$; $B_2'$, $B_2''$; ....$B_6'$, $B_6''$, as more fully described hereinafter with reference to FIG. 6. A further set of output or priority signals, collectively designated O′, O″ and referred to below as priority signals, are generated by networks $K_1'$ – $K_6'$ and $K_1''$ – $K_6''$ in the event of noncompletion of a seizure as likewise described in greater detail hereinafter.

The two interlock units Ib′ and Ib″ being identical, only unit Ib′ has been illustrated in detail in FIG. 3. This unit is shown divided into two halves constituted by respective sets of NAND gates 41 – 46, IX and 47 – 52, IY. The first set of NAND gates receive six inverted busy signals $\overline{X}_1'$ – $\overline{X}_6'$, collectively designated $\overline{X}'$, to derive therefrom the lockout signals $a_1'$ – $a_6'$, collectively designated *a*′, with gate 1X generating an overall busy signal $X_o'$ to indicate the engaged state of any discriminating network of the set $K_1'$ – $K_6'$ (FIG. 2) in response to a degradation signal (D) or a failure signal (A). In an analogous manner, the remaining NAND gates receive six inverted busy signals $\overline{Y}_1'$ – $\overline{Y}_6'$, collectively designated $\overline{Y}'$, to derive therefrom the lockout signals $b_1'$ – $b_6'$, collectively designated *b*′, with gate 1Y generating an overall busy signal $Y_o'$ to indicate the engaged state of any discriminating network of the same group due to a degradation signal (D) only. The input connections of NAND gates 41–52 are so arranged that each of these gates generates a lockout signal for the respective discriminating network $K_m'$ in response to a busy signal from any one of the remaining networks; thus $$a_m' = \sum_{n=1}^{n=m-1} X_n' + \sum_{n=m+1}^{n=6} X_n'$$

and $$b_m' = \sum_{n=1}^{n=m-1} Y_n' + \sum_{n=m+1}^{n=6} Y_n'.$$

The second interlock unit $I_b''$ generates analogous lock-out signals $a_m''$ and $b_m''$ in response to busy signals $X_m''$ and $Y_m''$, respectively.

In FIGS. 4 and 5 I have shown respective discriminating networks $K_m'$ and $K_m''$ representative of any pair of such networks illustrated in FIG. 2. The two paired networks are virtually identical, with certain exceptions described hereinafter, corresponding elements being identified by a prime mark in FIG. 4 and by a double-prime mark in FIG. 5. These elements include, in FIG. 4, a first NAND gate 4′ and a first AND gate 5′, forming part of an inhibiting register $M_I'$, a second NAND gate 6′ and a second AND gate 7′, forming part of a inhibiting register $M_{II}'$, and a set of NOR gates 10′ – 15′, forming part of an actuating register $M_{III}'$. Two further NAND gates 22″ and 21″, FIG. 5, have outputs connected to respective inputs of NAND GATES 4″ and 6″ via jumpers 1″ and 2″, the corresponding connections in FIG. 4 being open at 1′, 2′ with permanent application of a "true" signal (diagrammatically represented by a +sign) to the open-circuited NAND-gate input. Other elements include a NAND gate 8' working into an input of NAND gate 6', several NOR gates 9', 16', 17', 20', and two AND gates 18', 23', as well as a number of inverters 61' – 66'. An input of gate 17' is connected through another jumper 3' to an input of gate 11'; a pair of open-circuited terminals 19' are connected across the signal path leading through inverter 65' and gate 20'.

NAND gate 4' has five inputs, other than the one shown at 1' and referred to above, which respectively receive a degredation signal $D_m$ from one of the monitoring circuits $R_1$ –$R_6$ of FIG. 1, an inverted inefficiency signal $\overline{d}'$ relating to the transmission effectiveness of primary standby channel RC', an inverted disconnect signal $\overline{B}_m$ from associated control unit $Co_m$ (FIG. 6), an inverted allocation signal $T_m''$ relating to engagement of the alternate standby channel RC'' by the assigned working channel $TC_m$ (since the existence of such allocation eliminates the necessity for requesting the service of channel RC'), and a lockout signal $b_m'$ from the interlock unit Ib' of FIG. 3 (passing through inverter 61'). The output of NAND gate 4' is a blocking signal $\overline{W}_m'$ which (except when $m = 6$) is sent to all higher ranking discriminating networks of the same set to prevent emission of request signals G' therefrom; this output is applied via inverter 62' to an input of AND GATE 5'. The other inputs of AND gate 5', whose number varies with the rank of the network $K_m'$ in the sequence of precedence, receive similar blocking signals $\overline{W}_1'$, $\overline{W}_2'$, ...$\overline{W}_{(m-1)}'$ from the lower ranking networks of this set. In the case of the lowest ranking network ($m = 1$), gate 5' is replaced by a simple output lead from inverter 62'.

AND gate 5', when conductive, delivers an internal busy signal $w_m'$ to one input of NOR gate 9' whose other input receives a similar internal signal $v_m'$ from the output of AND gate 7' which, like gate 5', would be omitted if $m = 1$. An input of AND gate 7' receives, through the inverter 64', the output $\overline{V}_m'$ of NAND gate 6' which is also delivered (if $m \neq 6$) to the higher ranking networks of the same set as a blocking signal therefor. The remaining inputs of AND gate 7' analogously receive corresponding blocking signals $V_1'$, $V_2'$, ... $V_{(M-1)}'$ from the lower ranking networks of the set.

The inputs of NAND gate 6', other than the one designated 2' and referred to above, receive a failure signal $A_m$ from the corresponding monitoring circuit of FIG. 1, the complement $\overline{c}'$ of an inefficiency signal relating to a major disability of standby channel RC', the inverted disconnect and allocation signals $\overline{B}_m'$ and $\overline{T}_m''$, and the output of NAND gate 8' to whose inputs the lockout signal $a_m'$ from unit Ib' and in the case of a privileged channel, the complement $\overline{u}_m'$ of a pre-emptive signal $u_m'$ are applied. When the channel $CT_m$ is not privileged ($\overline{U}_m' = 1$), gate 8' operates as a simple inverter for lockout signal $a_m'$.

NAND GATE 22', which in the network of FIG. 4 is inneffectual but which would be active if channel RC' were not preferred over channel RC'', has three inputs respectively receiving an inverted allocation signal $\overline{T}_m'$ generated by the network itself, an inverted disconnect signal $\overline{B}_m''$ originating at the control unit $Co_m$ of FIG. 6, and an availability (or inverted unavailability) signal $\overline{Z}''$ relating to the alternate standby channel RC'', the complement Z'' of this latter signal assuming a finite value whenever that alternate channel exhibits any degree of defectiveness or is otherwise unavailable. The presence of signal $\overline{Z}''$, therefore, indicates virtually perfect transmission effectiveness of channel RC''.

Similarly, NAND gate 21' (which is also inactive in FIG. 4) has three inputs respectively receiving the inverted signals $\overline{B}_m''$ and $\overline{T}_m'$ as well as an availability signal S'' whose complement $\overline{S}''$ differs from the unavailability signal Z'' in that its presence indicates (apart from possible malfunctions preventing access) a major degree of disability of the alternate channel RC''. Signal $\overline{S}''$, therefore, shows that channel RC'' is at worst in a state of somewhat reduced effectiveness. Signals S'', Z'' as well as their counterparts S', Z' (FIG. 5) are generated by matrices H', H'' on the basis of the presence or absence of signals A'', D'', O''; $X_o''$, $Y_o''$ and A', D', O', $X_o'$, $Y_o'$.

Signals $\overline{V}_m'$ and $\overline{u}_m'$ are also applied to respective inputs of NOR gate 16' whose output is fed, together with internal busy signal $v_m'$, to NOR gate 17' generating the inverted busy signal $\overline{X}_m'$. The output $Y_m'$ of NOR gate 9', representing the complement of the other busy signal from this network, is delivered in parallel to respective inputs of NOR gates 10', 15' and 20', the last-mentioned connection passing through inverter 65'. NOR gate 10' additionally receives the execution signal F' from unit Et' (FIG. 1), its complement $\overline{F}'$ being supplied to an input of NOR gate 10' working into an input of NOR gate 13' whose other input receives the output of NOR gate 12'; the output of NOR gate 13' is fed back to an input of NOR gate 12', whose other input is tied to the output of NOR gate 20', and also feeds the second input of NOR gate 14' which generates the seizure signal $Q_m'$ in the presence of execution signal F'. The complement $\overline{Q}_m'$ of this seizure signal, derived from inverter 66', is fed to AND gate 18' also receiving, via inverter 63', the complement $V_m'$ of the output of NAND gate 6'. AND gate 18' generates a priority signal $O_m'$ which, together with the general busy signals $X_o'$ and $Y_o'$ from unit Ib' discussed in connection with FIG. 3, is transmitted to ancillary matrix H' (FIG. 1) via cable *k'*. The return cable *h'* from that ancillary matrix includes the leads carrying signals $\overline{c}'$, $\overline{d}'$, $\overline{Z}''$, $\overline{S}''$ as well as a holding signal E' generated by matrix H' under conditions described hereinafter; signal E' arrives at the second input of NOR gate 20'.

NOR gate 11', one of whose three inputs receives the internal signal $v_m'$ via jumper 3' while the other two inputs are connected to the outputs of NOR gates 10' and 15', generates the inverted request signal $\overline{G}_m'$ which is delivered to AND gate 23' along with the inverted preparatory signal $\overline{P}_m'$ generated by NOR gate 13'. The output of AND gate 23' constitutes the inverted allocation signal $\overline{T}_m'$ for channel RC'.

Except for an interchange of prime and double-prime marks, and for the aforedescribed difference in the circuitry 1', 2' and 1'', 2'', the network $K_m''$ of FIG. 5 is identical with network $K_m'$ of FIG. 4 and need therefore not be further described.

The control unit $Co_m$ of FIG. 6 is divided into two symmetrical halves. Its upper half receives signals $\overline{G}_m'$, $Q_m'$ from network $K_m'$ (FIG. 4) while generating the inverted disconnect signal $\overline{B}_m'$ for network $K_m'$, its lower half playing an analogous role with reference to network $K_m''$ (FIG. 5). Defect signals $A_m$ and $D_m$, from the corresponding monitoring circuit of FIG. 1, are delivered to respective inputs of a NOR gate 36 common to both halves of this unit, another common input lead carrying a train of periodic quenching pulses J originating at a pulse generator 37.

The upper half of unit $Co_m$ comprises a NOR gate 31′ receiving the signals $\overline{G}_m'$ and $Q_m'$, the output of this gate being delivered on the one hand to an input of an AND gate 33′ and on the other hand to a monostable element or monoflop 32′ whose operating interval is a small fraction of the recurrence period of pulses J. At the end of that operating interval, after being triggered by an output from NOR gate 31′, monoflop 32′ delivers a delayed pulse to the second input of AND gate 33′ whose output is tied to an input of a NOR gate 34′ generating the disconnect signal $B_m'$. This disconnect signal is fed back to the other input of NOR gate 34′ by way of a further NOR gate 35′ having two additional inputs respectively receiving the quenching pulse J and the output of NOR gate 36.

The identical elements 31′ – 35″ in the lower half of unit $Co_m$ need not be described in detail.

The logic illustrated in FIGS. 3 – 6 establishes the following relationships for the output signals $G_m$, $O_m$, $P_m$, $Q_m$, $X_m$, $Y_m$of FIG. 4 as well as the internal signals $v_m$, $w_m$ (the unprimed characters represent both the primed and the double-primed forms of these signals):

$$G_m = X_m + Y_m(\overline{F} + O_m)$$
$$O_m = V_m\overline{Q}_m$$
$$P_m = Y_m\overline{F} + P_m(Y_m + E)$$
$$Q_m = V_m\overline{Q}_m$$
$$X_m = x_m + u_m V_m$$
$$Y_m = w_m + y_m$$

$$v_m = \left(\prod_{n=1}^{n=m-1} \overline{V}_n\right) V_m$$

$$W_m = \left(\prod_{n=1}^{n=m-1} \overline{W}_n\right) W_m$$

Also:

$$V_m' = A_m(u_m' + \overline{a}_m')B_m'\overline{T}_m''\overline{c}'$$
$$W_m' = D_m b_m'\overline{B}_m'\overline{T}_m''\overline{d}'$$
$$V_m'' = A_m(u_m'' + \overline{a}_m'')\overline{B}_m''\overline{T}_m'\overline{c}''(S' + B_m' + T_m')$$
$$W_m'' = D_m\overline{b}_m''\overline{B}_m''\overline{T}_m'\overline{d}_m''(Z' + B_m' + T_m'')$$

DETAILED OPERATION

Let us assume, for the moment, that channel preemptive m is not privileged, i.e., that the inverted preemptive signals $\overline{u}_m'$ and $\overline{u}_m''$ in FIGS. 4 and 5 are in the state "1". If a degradation signal $D_m$ is received from that channel, a blocking signal $W_m'$ ($\overline{W}_m'$–0) will be generated by network $K_m'$ if the following conditions are simultaneously satisfied:

1. Standby channel RC′ is free even from a minor disability and is otherwise accessible ($\overline{d}' = 1$).

2. There has not been a recent unsuccessful attempt on the part of network $K_m'$ to seize the channel RC′ ($\overline{B}_m' = 1$).

3. The companion network $K_m''$ has not already seized the alternate standby channel RC″ in behalf of working channel $CT_m$ ($\overline{T}_m'' = 1$).

4. Standby channel RC′ has not been allocated to another working channel ($b' = 0$).

Next, blocking signal $W_m'$ is inverted at 62′ and clears the AND gate 5′ if no lower ranking network of the same set competes for channel RC′, i.e., if the inverted blocking signals $\overline{W}_1'$ etc., arriving over the inter-network connections all have the state "1". This generates the internal busy signal $w_m'$ and the external busy signal $\overline{Y}_m'$ ($Y_m' = 0$). Under the assumed circumstances, execution or no busy signal F′ arrives from station Tr so that NOR gate 10′ has a finite output which results in the generation of preparatory signal $P_m'$ ($\overline{P}_m' = 0$) via NOR gate 13′; the finite output of NOR gate 10′ also arrives at NOR gate 11′ to generate the request signal $G_m'$ ($\overline{G}_m' = 0$). The resulting de-energization of both inputs of AND gate 23′ generates the allocation signal $T_m'$ ($\overline{T}_m' = 0$) which is ineffectually fed to NAND gates 21′ and 22′.

Signal $G_m'$ arrives at NOR gate 31′ of FIG. 6 to energize one of the inputs of AND gate 33′ and to trigger the monoflop 32′ which begins to measure a timing interval for the completion of the seizure of channel RC′. If, during this interval, unit Et′ at the remote station emits the execution signal F′ ($\overline{F}' = 0$), NOR gate 14′ generates the seizure signal $Q_m'$ so that NOR gate 31′ becomes nonconductive and AND gate 33′ does not respond at the end of the operating interval of monoflop 32′. Unit $Co_m$ thus maintains the finite value ($\overline{B}_m' = 1$) of the inverted disconnect signal so that the operation of NAND gate 4′ is not modified until the degradation signal $D_m$ disappears or a disability develops in the seized channel RC′ as indicated by the absence of the inverted inefficiency signal $\overline{d}'$. In either of these latter events, channel RC′ is released and channel $CT_m$ resumes its operation unaided.

Since the busy signal $Y_m'$ has actuated the interlock unit Ib′ of FIG. 3 to generate a lockout signal $b'$ for all related networks, no blocking signal from a lower ranking network can appear at this stage in any of the inputs of AND gate 5′.

If the defect signal from channel $CT_m$ is of the "failure" type ($A_m$) rather than the "degradation" type ($D_m$), NAND gate 6′ operates under the same conditions as NAND gate 4′ in the case previously considered, except that lockout signal $a_m'$ and inefficiency signal $c'$ replace the signals $b_m'$ and $d'$, respectively. The inverted inefficiency signal $\overline{c}'$ denotes by its presence the fact that standby channel RC′ is at least free from a major disability though possibly afflicted by a minor disability which would give rise to signal $d'$ and would prevent its allocation to a merely degraded working channel. NAND gate 6′ generates the blocking signal $V_m'$ ($\overline{V}_m' = 0$) and, if no similar blocking signal is applied by the inter-network connections to AND gate 7′ i.e., if their complements $\overline{V}_1'$ etc., have the state "1" ), gives rise to the internal busy signal $v_m'$ as well as to the two external busy signals $Y_m'$ ($\overline{Y}_m' = 0$) and $X_m'$ ($\overline{X}_m' = 0$). Interlock unit Ib′ thereupon transmits lockout signals $a'$ and $b'$ to both subdivisions $M_I'$ and $M_{II}'$ of all other networks of the same set so that none of these other networks can be activated as long as subdivision $M_{II}'$ of network $K_m'$ is busy.

With none of the corresponding subdivision $M_{II}'$ of the remaining networks engaged, as indicated by the conductive state of AND gate 7', signal $v_m'$ is applied directly to NOR gate 11' by way of jumper 3', thus irrespectively of the presence or absence of an execution signal F' on the channel $CH_{II}$ (FIG. 1) linking the two communicating stations. This fact enables the "failure" subdivision $M_{II}'$ of network $K_m'$ (or of any other such network) to override a previous allocation of spare channel RC' (or, in the case of network $K_m''$, of spare channel RC'') to another working channel with a less serious degree of impairment as established by the presence of degradation signal D, rather than A, in subdivision $M_I'$, rather than subdivision $M_{II}'$, of the discriminating network assigned to such other channel.

A takeover even from a seriously defective competing channel can occur if channel $CT_m$ associated with the networks of FIGS. 4 and 5 is privileged, as established by the application of a pre-emptive signal ($\bar{u}_m' = \bar{u}_m'' = 0$) to both these networks. The appearance of this pre-emptive signal in the inputs of NAND gate 8' and NOR gate 16' eliminates the effect of lockout signal $a_m'$ upon the generation of internal signals $v_m'$ and lets the output signal $V_m'$ of NAND gate 6' travel directly to NOR gate 17', thus bypassing the AND gate 7' and generating the busy signal $X_m'$ irrespectively of the presence of a blocking signal from any lower-ranking, normally preferred network of the same set.

We shall now consider the case where, in either of the two situations just discussed, the network of FIG. 4 overrides a prior allocation of standby channel RC' to a competing working channel. With F' = 1 in the input of NOR gate 10', signals $P_m'$ and $Q_m'$ cannot be generated; the concurrent presence of signals $V_m'$ and $\bar{Q}_m$ in the inputs of AND gate 18' thus gives rise to the priority signal $O_m'$ which stimulates the matrix H' into the emission of the holding signal E' to all the associated discriminating networks. This holding signal creates a zero voltage in the output of NOR gate 20' of each network so that NOR gate 12' becomes a simple inverter for the feedback signal from NOR gate 13', thereby maintaining the output of the latter gate at its pre-existing value. Thus, until completion of takeover, the previously activated network assigned to the competing working channel continues to emit signals P' and Q' as long as execution signal F' is present so that $\bar{F}' = 0$ in the input of gate 14'. This condition is unaffected even by the blocking of AND gate 7' of the competing network as a result of the appearance of lockout signal *A'* due to the generation of busy signal $X_m$ in the network of the privileged channel. With the disappearance of the internal and external busy signals at the competing network, the request signal G' thereof also vanishes, yet the evaluation unit Et' at the remote station (FIG. 1) continues to emit the execution signal F', owing to the presence of another request signal from the network $K_m'$ assigned to the privileged channel, as long as the request of this latter channel is not satisfied. If, for example, unit Et' determines on the basis of incoming signals $A^x$, $D^x$, $\bar{Q}^x$ that the corresponding channel in the preceding section is unsuccessfully calling for access to a standby channel, it will not switch channel RC' from its previous working channel to channel $CT_m$. Under these conditions, signals $P_m'$ and $Q_m'$ will not be generated and the timing circuit 31' – 33' of FIG. 6 will run its course, eventually energizing an input of NOR gate 34' to produce the disconnect signal $B_m'$ ($\bar{B}_m'$ =0) with consequent blocking of NAND gates 4' and 6' of network $K_m'$ to release that network. Upon the cessation of busy signals $Y_m'$ and $X_m'$, the competing network is fully reactivated so that its output signals X', Y' and G' reappear for as long as the defect signal D' or A' persists in its input.

Disconnect signal $B_m'$ remains in effect until the arrival of the next quenching pulse J or the absence of both types of defect signals $A_m$, $D_m$ from the inputs or NOR gate 36, whichever is earlier; the resulting interruption of the output of NOR gate 35' breaks the feedback loop of NOR gate 34' whereupon the control unit $C_m$ returns to normal.

If, on the other hand, unit Et' determines that the privileged channel $CT_m$ should be given access to the otherwise engaged standby channel RC', it momentarily interrupts the execution signal F', thereby completely releasing the competing network, with generation of preparatory signal $P_m'$ upon the concurrent de-energization of both inputs of NOR gate 10'. On completion of the switchover at the transmitting end, execution signal F' reappears and gives rise to seizure signal $Q_m'$ as described above, with concurrent cancellation of the priority signal $O_m'$ and suppression of holding signal E'.

As long as the preferred standby channel RC' is available for a seizure by network $K_m'$, the simultaneous application of defect signal D or A to companion network $K_m''$ (FIG. 5) is ineffectual, owing to the absence of unavailability signal S' or Z' whose complement $\bar{S}'$ or $\bar{Z}'$ has the state "1", provided that the other two inputs of NAND gate 21'' or 22'' are also energized by the absence of a disconnect signal $B_m'$ ($\bar{B}_m'$ = 1) and an allocation signal $T_m''$ ($\bar{T}_m''$ = 1). Signal S', when present, indicates such a degree of disability (or inaccessibility) of the primary spare channel RC' that it cannot be used even to relieve a completely defective working channel, or has already been allocated to such a channel as determined by the existence of busy signal $X_o'$, so that the secondary spare channel RC'' must be called upon to assist the failing channel $CT_m$. Signal Z', when present without the signal S', indicates that the primary channel suffers from only a minor disability or, as determined by the existence of busy signal $Y_o'$, has been allocated to a degraded working channel (other than channel $TC_m$ if $\bar{T}_m'$ = 1) so that the "failure" subdivision $M_{II}'$ of network $K_m'$ could obtain access to channel RC' in the manner described above, such access being denied to the "degradation" subdivision $M_I''$ of network $K_m''$ wherefore the latter subdivision is conditioned for activation. Once either subdivision of the latter network has been activated, this condition is maintained by feedback via allocation signal $T_m''$ ($\bar{T}_m''$ = 0) regardless of the state of accessibility of primary channel RC'.

Advantageously, as illustrated in FIGS. 4 and 5, each discriminating network $K_m'$ or $K_m'$ is divided into two physically distinct portions 101, 102 (FIG. 4) or 201, 202 (FIG. 5), the first one carrying the "degradation" unit $M_I'$ or $M_I''$ and associated circuitry whereas the second one carries the "failure" unit $M_{II}'$, $M_{II}''$ together with the corresponding operating unit $M_{III}'$ or $M_{III}''$ and ancillary elements. In practice, these two portions may be designed as separate printed-circuit cards which are detachably interconnected at the illustrated junctions, removal of portion 101 or 201 enabling the network to function in the same manner as before apart from being unable to distinguish between different degrees of channel impairment. Also, no provision is made for a special privilege under these simplified conditions so that the bypass 19′ or 19″ must be closed to deliver the signal $v_m'$ via gate 9′ or 9″ (acting as a simple inverter) to the input at gate 12′. Since there no longer exists any priority as between conditions of failure or degradation, with omission of the circuit generating the signal $O_m'$ or $O_m''$, the jumper 3′ or 3″ should be removed to break the direct connection between gates 7′ and 11′or 7″ and 11″.

Similarly, if only a single standby channel is included in the system, the set of companion networks $K_m''$ can be omitted without further modification of networks $K_m'$ inasmuch as the connections between the paired networks (carrying signals $\overline{T}_m''\cdot\overline{B}_m''$) are ineffectual in any event and have been provided only as part of a master circuit arrangement which may be readily converted for use as a primary or a secondary discriminating network.

Naturally, the principles disclosed herein may also be extended to systems with more than two standby channels per section and/or with circuits capable of discriminating between more than three levels of transmission effectiveness.

I claim:

1. In a telecommunication system provided with a transmitting station and a receiving station interconnected by a plurality of parallel working channels, the combination therewith of:

monitoring means at said receiving station for ascertaining the quality of signal transmission over any of said working channels from said transmitting station to said receiving station, said monitoring means generating a defect signal individual to any working channel upon detecting an impairment in signal transmission thereover;

a supervisory logic matrix common to all said working channels connected to said monitoring means, said logic matrix including a plurality of discriminating networks respectively assigned to said working channels and responsive to the corresponding defect signals for sending a request signal to said transmitting station;

at least one standby channel connectable between said stations to relieve any defective working channel;

first switch means at said transmitting station responsive to said request signal for connecting a transmitting end of said standby channel in parallel with the corresponding end of said defective working channel;

answer-back means at said transmitting station for sending an execution signal to said receiving station in response to completion of such connection by said first switch means, the discriminating network assigned to said defective working channel being responsive to said execution signal for generating a seizure signal;

and second switch means at said receiving station responsive to said seizure signal for completing the allocation of said standby channel to said defective working channel;

said logic matrix further comprising a plurality of control units respectively associated with said discriminating networks for registering said request and seizure signals, and timing means in each control unit for generating a disconnect signal to release the associated discriminating network upon the nonoccurrence of said seizure signal within a predetermined interval from the generation of said request signal.

2. The combination defined in claim 1 wherein said timing means comprises a monostable element, first gate means responsive to the presence of said request signal with concurrent absence of said seizure signal for generating an output signal triggering said monostable element into emission of a delayed pulse, second gate means responsive to coincidence of said output signal and said delayed pulse for generating said disconnect signal, and feedback means for maintaining said disconnect signal beyond the cessation of said pulse.

3. The combination defined in claim 2 wherein said second gate means includes resetting means for suppressing said disconnect signal, a source of recurrent quenching pulses connected to said resetting means for periodically actuating same, and input means for said resetting means connected to said monitoring means for canceling said disconnect signal upon disappearance of said defect signal.

4. The combination defined in claim 1 wherein said discriminating networks are interconnected in a predetermined sequence establishing an order of precedence to prevent concurrent seizure of said standby channel by more than one of said networks, said logic including inter-network connections for the transmission of lockout signals to all other networks upon activation of one of said networks by an incoming defect signal, to prevent the emission of request signals by said other networks.

5. The combination defined in claim 4 wherein at least one of said discriminating networks includes preemptive circuit means operable to provide the associated working channel with privileged access to said standby channel, said circuit means including first circuitry for generating said request signal irrespectively of any lockout signal arriving over said inter-network connections from a previously activated network assigned to a nonprivileged working channel, said circuit means further including second circuitry for generating a priority signal in the presence of such blocking signal concurrently with said request signal, said logic matrix comprising third circuitry responsive to said priority signal for applying to said previously activated network a holding signal to maintain the seizure signal thereof upon continuing presence of an execution signal from said transmitting station, said answer-back means being responsive to the arrival of said request signal for ascertaining the switchability of said standby channel and thereupon interrupting said execution signal preparatorily to a transfer of said standby channel to the privileged working channel with consequent termination of said holding signal whereby said previously activated network is deactivated.

6. In a telecommunication system provided with a transmitting station and a receiving station interconnected by a plurality of parallel working channels, the combination therewith of:

monitoring means at said receiving station for ascertaining the quality of signal transmission over any of said working channels from said transmitting station to said receiving station, said monitoring means generating a defect signal individual to any working channel upon detecting an impairment in signal transmission thereover, said defect signal being alternatively of a first and a second type respectively indicating a relatively low and a relatively high degree of disability;

a supervisory logic matrix common to all said working channels connecting to said monitoring means, said logic matrix including a plurality of discriminating networks respectively assigned to said working channels and responsive to the corresponding defect signals for sending a request signal to said transmitting station;

at least one standby channel connectable between said stations to relieve any defective working channel;

first switch means at said transmitting station responsive to said request signal for connecting a transmitting end of said standby channel in parallel with the corresponding end of said defective working channel;

answer-back means at said transmitting station for sending an execution signal to said receiving station in response to completion of such connection by said first switch means, the discriminating network assigned to said defective working channel being responsive to said execution signal for generating a seizure signal;

and second switch means at said receiving station responsive to said seizure signal for completing the allocation of said standby channel to said defective working channel;

said logic matrix further including an interlock unit connected to said discriminating networks for receiving respective busy signals therefrom and generating lockout signals respectively applied to said discriminating networks to prevent the emission of a request signal for said standby channel upon prior seizure thereof by another discriminating network;

each discriminating network including a first subdivision responsive to the first type of defect signal and a second subdivision responsive to the second type of defect signal, said interlock unit including a first gate circuit connected to receive a busy signal from any discriminating network assigned to a working channel exhibiting said low degree of disability and to transmit a first type of lockout signal to the first subdivisions of the remaining discriminating networks, said interlock unit further including a second gate circuit connected to receive a busy signal from any discriminating network assigned to a working channel exhibiting either degree of disability and to transmit a second type of lockout signal to the second subdivisions of the remaining discriminating networks, said second subdivisions thus being free to respond to said second type of defect signal in the presence of only said first type of lockout signal.

7. The combination defined in claim 6 wherein said logic matric further comprises a plurality of control units respectively associated with said discriminating networks for registering said request and seizure signals, and timing means in each control unit for generating a disconnect signal to release the associated discriminating network upon the nonoccurrence of said seizure signal within a predetermined interval from the generation of said request signal.

8. The combination defined in claim 6 wherein said discriminating networks are arranged in a predetermined order of precedence and, except for the highest ranking network, are provided with first and second outputs extending from said first and second subdivisions thereof to corresponding subdivisions of all higher ranking networks for transmitting thereto a blocking signal in the presence of a defect signal and in the absence of a blocking signal from a lower ranking network, to prevent the emission of request signals by said higher ranking networks.

9. The combination defined in claim 6 wherein at least one of said discriminating networks includes preemptive circuitry in its second subdivision operable to override a lockout signal applied thereto from said interlock unit, thereby giving the assigned working channel privileged access to said standby channel.

10. The combination defined in claim 6, further comprising test means for ascertaining the transmission effectiveness of said standby channel and for generating an inefficiency signal indicative of a reduced degree of such effectiveness, said logic including inhibiting means responsive to said inefficiency signal for preventing the relief of a defective working channel by said standby channel at least in the presence of said first type of defect signal at the first subdivision of the discriminating network assigned to said defective working channel.

11. The combination defined in claim 10 wherein said inefficiency signal is alternatively of a first type indicating any substantial reduction in effectiveness and of a second type indicating only a relatively severe reduction in effectiveness, said inhibiting means directing said first type of inefficiency signal to said first subdivision and said second type of inefficiency signal to said second subdivision for respectively preventing a response thereof to said first and said second type of defect signal.

12. In a telecommunication system provided with a transmitting station and a receiving station interconnected by a plurality of parallel working channels, the combination therewith of:

monitoring means at said receiving station for ascertaining the quality of signal transmission over any of said working channels from said transmitting station to said receiving station, said monitoring means generating a defect signal individual to any working channel upon detecting an impairment in signal transmission thereover;

a supervisory logic matrix common to all said working channels connected to said monitoring means, said logic matrix including a plurality of discriminating networks respectively assigned to said working channels and responsive to the corresponding defect signals for sending a request signal to said transmitting station;

at least one standby channel connectable between said stations to relieve any defective working channel;

first switch means at said transmitting station responsive to said request signal for connecting a transmitting end of said standby channel in parallel with the corresponding end of said defective working channel;

answer-back means at said transmitting station for sending an execution signal to said receiving station in response to completion of such connection by said first switch means, the discriminating network assigned to said defective working channel being responsive to said execution signal for generating a seizure signal;

and second switch means at said receiving station responsive to said seizure signal for completing the allocation of said standby channel to said defective working channel;

said discriminating networks being interconnected in a predetermined sequence establishing an order of precedence to prevent concurrent seizure of said standby channel by more than one of said networks, said logic including inter-network connections for the transmission of lockout signals to all other networks upon activation of one of said networks by an incoming defect signal, to prevent the emission of request signals by said other networks;

at least one of said discriminating networks including pre-emptive circuit means operable to provide the associated working channel with privileged access to said standby channel, said circuit means including first circuitry for generating said request signal irrespectively of any lockout signal arriving over said inter-network connections from a previously activated network assigned to a nonprivileged working channel, said circuit means further including second circuitry for generating a priority signal in the presence of such blocking signal concurrently with said request signal, said logic matrix comprising third circuitry responsive to said priority signal for applying to said previously activated network a holding signal to maintain the seizure signal thereof upon continuing presence of an execution signal from said transmitting station, said answer-back means being responsive to the arrival of said request signal for ascertaining the switchability of said standby channel and thereupon interrupting said execution signal preparatorily to a transfer of said standby channel to the privileged working channel with consequent termination of said holding signal whereby said previously activated network is deactivated.

13. The combination defined in claim 12 wherein said logic matrix further includes an interlock unit connected to said discriminating networks for receiving respective busy signals therefrom and generating lockout signals respectively applied to said discriminating networks to prevent the emission of a request signal for said standby channel upon prior seizure thereof by another discriminating network.

14. The combination defined in claim 13 wherein said defect signal is alternatively of a first and a second type respectively indicating a relatively low and a relatively high degree of disability, each discriminating network including a first subdivision responsive to the first type of defect signal and a second subdivision responsive to the second type of defect signal, said interlock unit including a first gate circuit connected to receive a busy signal from any discriminating network assigned to a working channel exhibiting said low degree of disability and to transmit a first type of lockout signal to the first subdivisions of the remaining discriminating networks, said interlock unit further including a second gate circuit connected to receive a busy signal from any discriminating network assigned to a working channel exhibiting either degree of disability and to transmit a second type of lockout signal to the second subdivisions of the remaining discriminating networks, said second subdivisions thus being free to respond to said second type of defect signal in the presence of only said first type of lockout signal.

15. In a telecommunication system provided with a transmitting station and a receiving station interconnected by a plurality of parallel working channels, the combination therewith of:

monitoring means at said receiving station for ascertaining the quality of signal transmission over any of said working channels from said transmitting station to said receiving station, said monitoring means generating a defect signal individual to any working channel upon detecting an impairment in signal transmission thereover;

a pair of standby channels alternatively connectable between said stations to relieve any defective working channel;

a supervisory logic matrix common to all said working channels connected to said monitoring means, said logic matrix including a plurality of pairs of discriminating networks respectively assigned to said working channels, the networks of each pair including signal-generating means individually responsive to the corresponding defect signals for sending to said transmitting station two distinctive types of request signals respectively identifying said standby channels;

first switch means at said transmitting station responsive to either type of request signal for connecting a transmitting end of a selected standby channel in parallel with the corresponding end of said defective working channel;

answer-back means at said transmitting station for sending an execution signal to said receiving station in response to completion of such connection by said first switch means, the discriminating network assigned to said defective working and to the selected standby channel being responsive to said execution signal for generating a seizure signal;

second switch means at said receiving station responsive to said seizure signal for completing the allocation of the selected standby channel to said defective working channel, said standby channels being a primary channel selectable by request signals from the networks of said one set and a secondary signal selected by request signals from the networks of said other set, said preferential circuitry including circuit means for generating an availibility signal relating to said primary channel and conductor means for delivering said availability signal to the networks of said other set to inhibit activation thereof upon accessibility of said primary channel to the networks of said one set;

preferential circuitry interconnecting the networks of each pair for giving one set of networks precedence over the other set of networks, respectively paired therewith, in generating said request signal;

and test means for ascertaining the transmission effectiveness of each standby channel and for generating an inefficiency signal alternatively of a first type, indicating any substantial reduction in effectiveness, and of a second type, indicating only a relatively severe reduction in effectiveness; said defect signal being alternatively of a first and a second type respectively indicating a relatively low and a relatively high degree of disability; each discriminating network including a first subdivision responsive to the first type of defect signal and a second subdivision responsive to the second type of defect signal; said logic matrix further including interlocking means for transmitting, upon receiving a busy signal from any discriminating network assigned to a working channel exhibiting said low degree of disability, a first type of lockout signal to the first subdivisions of the remaining discriminating networks to prevent the emission of a request signal therefrom and for transmitting, upon receiving a busy signal from any discriminating network assigned to a working channel exhibiting either degree of disability, a second type of lockout signal to the second subdivisions of the remaining discriminating network to prevent the emission of a request signal therefrom while leaving said second subdivisions free to respond to said second type of defect signal in the presence of only said first type of lockout signal; said availability signal being alternatively of a first type, indicating substantially perfect transmission effectiveness of said primary channel, and of a second type, indicating at worst a reduced transmission effectiveness of said primary channel insufficient to generate said second type of inefficiency signal; said logic matrix including inhibiting means directing said first type of inefficiency signal to said first subdivision and said second type of inefficiency signal to said second subdivision of any network of the corresponding set for respectively preventing a response thereof to said first and said second type of defect signal; said first subdivision of each network of said other set being connected to receive said first type of availability signal for inhibition thereby upon both unrestricted and partly restricted accessibility of said primary channel to the networks of said one set.

16. The combination defined in claim 15 wherein each discriminating network is provided with an actuating unit common to said first and second subdivisions thereof, said network being physically subdivided into two separable portions, one of said portions bearing said first subdivision, the other of said portions bearing said second subdivision and said actuating unit.

* * * * *